United States Patent [19]

Ehsanipour

[11] 4,360,346
[45] Nov. 23, 1982

[54] MAP HOLDING AND LOCATING KIT

[76] Inventor: Kamaran Ehsanipour, 400 Davey Glen Rd., Apt. 4525, Belmont, Calif. 94002

[21] Appl. No.: 170,136

[22] Filed: Jul. 18, 1980

[51] Int. Cl.³ .............................................. G09B 29/10
[52] U.S. Cl. .................................... 434/153; 281/31; 283/34
[58] Field of Search .................. 434/153, 150; 281/31; 283/34, 35

[56] References Cited

U.S. PATENT DOCUMENTS 1,526,044  2/1925  Blake .................................. 281/31 X
2,789,372  4/1957  Ribak .................................. 434/153

FOREIGN PATENT DOCUMENTS 677952  12/1929  France .................................. 283/34

Primary Examiner—William H. Grieb
Attorney, Agent, or Firm—Julian Caplan

[57] ABSTRACT

Folded map booklets showing street and street names fit into pockets in the cover of a map holder. The holder may be folded into compactform. In open position, individual sections of the folded map may be selectively exposed. Along the top edge of the holder is a horizontal scale; slidable along the horizontal scale is a vertical scale. Means is provided to pivot the vertical scale out of the way when the holder is to be folded. An index is provided showing for each street the precise horizontal and vertical scale readings where the name of the street is printed on the map.

3 Claims, 6 Drawing Figures

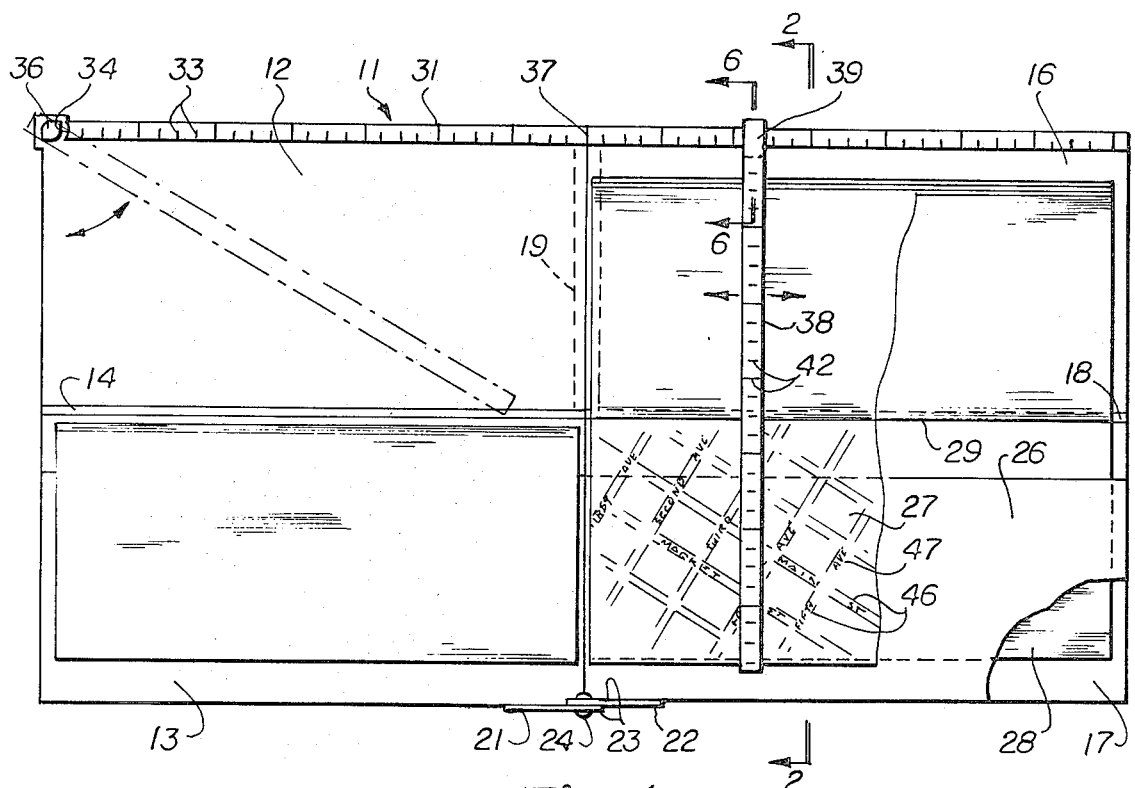
Fig. 1
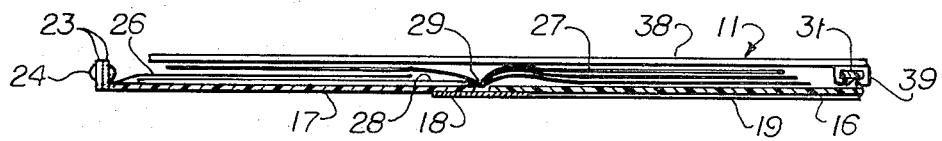
Fig. 2
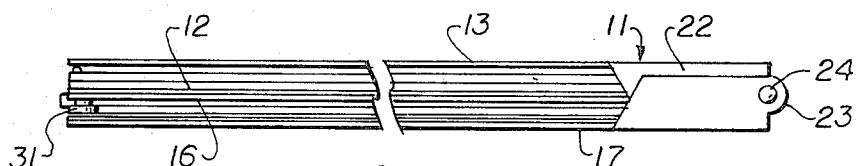
Fig. 3
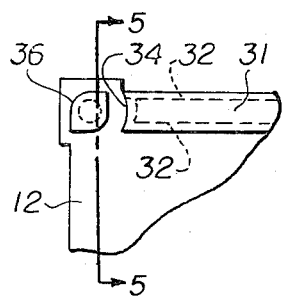
Fig. 4     Fig. 6     Fig. 5

MAP HOLDING AND LOCATING KIT

This invention relates to a new and improved map holding and locating kit.

Commonly used street maps comprise fan-folded sheets of paper on which are printed streets and street names. Conventionally such maps are marked with a rectangular grid. Letters and numbers are displayed in the margins of the map opposite the rows and columns of the grid. An index of street names is printed on a suitable location on the map or on the reverse thereof and opposite each street name is a letter and number to assist in locating the particular square of the grid where the street is located. Unfortunately, locating street names by use of convention grids is difficult and time consuming. Each square of the grid occupies considerable space (in order to avoid cluttering the map with too many grid markings) and thus considerable time and effort is required to locate the street. For motorists and particularly for real estate sales and delivery men, use of street maps is a serious problem.

In accordance with the present invention, a horizontal scale is fixed across the top of the map holder and a vertical scale slides along the horizontal scale. The gradations between markings on these two scales may be very fine and thus more precise location of a street name may be indicated by the accompanying index. Such a system of scales makes finding a street name much more convenient and rapid. As a matter of fact, the grid pattern of conventional maps is made unnecessary.

Because, as hereinafter described, the map holder is foldable, it is desirable that the vertical scale not interfere with the folding of the holder. One way of accomplishing this result is to make the vertical scale detachable. However, in a preferred embodiment illustrated and described herein, it is possible merely to pivot the vertical scale so that it extends diagonally across one of the holder sections and does not become detached from the holder when in storage position.

Another feature of the invention is the fact that the horizontal top scale is formed with grooves on its top and bottom edges and the vertical scale has a fitting at its upper end having inturned flanges which fit into the grooves in the top scale. Thus, the vertical scale may be slid along the horizontal scale and remain substantially perpendicular thereto so as to make the coordinates of the index more precisely functional.

Another problem with conventional street maps which are fan-folded is that the operation of unfolding the map to the proper location where the streets sought is displayed is difficult for the ordinary user. One alternative is to fully open the map, which is cumbersome and frequently results in damage to the map and also occasions difficulty in refolding. A second alternative is to flip the folds of the map over looking for the proper section where the street sought is displayed. When the letters and numbers are only on the margins of the map, this is a particularly awkward way to locate numbers.

In accordance with the present invention a holder is provided which is hinged and foldable into sections so as to provide a flat booklet with fairly stiff covers. The map and index are contained within the holder. A preferred way of inserting the map in the holder is to attach the map to a fairly stiff piece of cardboard, plastic or other suitable material shaped to fit inside a paper or fabric pocket formed in one of the sections of the holder in a manner similar to the way replaceable pocket part supplements of law books are detachably secured to the backs of books. This makes it possible to change the maps from time to time or to furnish different maps in different geographical locations for use with uniform holders.

Still a further feature of the invention is the means whereby the sections of the holder are hinged together so that they may be folded into fourths, each fourth slightly larger than a fan-fold of a conventional street map.

Other objects of the present invention will become apparent upon reading the following specification and referring to the accompanying drawings in which similar characters of reference represent corresponding parts in each of the several views.

In the Drawings:

FIG. 1 is a top plan view of a map holder in accordance with the present invention, the right hand side of the holder being broken away in section to reveal different layers.

FIG. 2 is a vertical sectional view taken substantially along the line 2—2 of FIG. 1.

FIG. 3 is an enlarged end elevational view showing the map fully folded.

FIG. 4 is a fragmentary detailed plan view of the upper left hand corner of FIG. 1.

FIG. 5 is the sectional view taken substantially along the line 5—5 of FIG. 4.

FIG. 6 is an enlarged fragmentary section of view taken substantially along the line 6—6 of FIG. 1.

Holder 11 is formed of four foldable sections of cover. The top left section 12 is joined to the bottom left section 13 by a fabric horizontal hinge 14 so that the section 12 may be folded down over the section 13. Similarly the top right section 16 is connected to the bottom right section 17 by similar fabric hinge 18. The top sections 12 and 16 are similarly formed with a fabric hinge 19.

The sections 13 and 17 are hinged together by means of left hinge plate 21 which is secured to the cover section 13 and right hinge plate 22 secured to section 17. The plates 21, 22 have overlapping arcuate ears 23 through which fit a hinge rivet 24. Thus, the sections may be folded downwardly and also from left to right to the position shown in FIG. 3.

Lower sections 13 and 17 are provided with pockets 26 which are flaps of paper or fabric secured to the cover sections in a well known manner. The faces of these pockets 26 may be printed with instructions for use of the device. An index of street names and coordinates for locating the same on the map may be printed on the map or may be separately provided. Map 27 is preferably in two sections; one on the left hand side of FIG. 1 and the other on the right hand side. The inner edges of the two sections abut as closely as possible. The back fold of the map is attached to a semi-rigid insert of material such as cardboard 28 shaped to fit into the pocket 26 and secure the map section 27 in place. Each section of the map 27 is formed with folds 29 in the manner of conventional maps.

Along the top edge of the holder 11 is a top scale 31 which is horizontally disposed and has in its top and bottom edges grooves 32. On the top face of scale 31 are markings 33 shown schematically in FIG. 1. The left end of scale 31 has a terminus 34 and a button 36 is spaced to the left of the terminus 34 for a purpose hereinafter described. In order to facilitate folding the holder, a split 37 is formed in the top scale 31 in alignment with the axis of the hinge rivet 24.

Vertical scale 38 is intended to slide along the horizontal scale 31. For this purpose at its upper end it has a fitting 39 having inwardly turned flanges 41 which fit into the grooves 32 of the top scale 31. Markings for the two are displayed on the vertical scale as shown schematically in FIG. 1. It will thus be seen that the vertical scales 38 may be slid along the scale 31 and by reason of the closeness of fit of the flanges 41 in grooves 32 and gravity the scale 38 is perpendicular to the scale 31.

Map 27 is selected depending upon the requirements of the user. As has previously been stated, preferably there are two sections to the map, one on the left and one on the right. The cardboard stiffener 28 or other means which is attached to the map 27 is inserted in the pocket 26, one on each side. Preparatory to folding the holder 11, scale 38 is slid to the left, as viewed in FIG. 1, until the in-turned flanges 41 of the fitting 39 pass the terminus 34 (see FIG. 4) and fit around the button 36, as shown in FIG. 5. The vertical scale 38 may then be pivoted diagonally to the dot-and-dash position shown in FIG. 1. Thereupon, the top sections 12 and 16 may be folded down about the hinges 14 and 18 to overlie the bottom sections 13 and 17, respectively. Thereupon, the left and right sections may be folded together about the fabric hinge 19 and the hinge pin 24 to assume the completely folded position shown in FIG. 3.

When it is necessary to use the map, the map is unfolded in the reverse of the procedure heretofore described. The user seeking a street name consults the index for the particular map inserted in the holder, and from this index determines which particular map section is to be consulted, flipping the folds 29 of the map over until the particular map section is exposed. The index also gives a reading 33 on the top scale 31. The vertical scale is turned down from its diagonal position shown in FIG. 1 to a vertical position and pushed to the right so that the flanges 41 engage in the grooves 32 of the top scale 31. Scale 38 is pushed along the scale 31 until one of its edges (e.g., its right-hand edge) coincides with the index-indicated markings 33 on the scale 31. The user reads on the scale 38 the proper marking 42 designating a street name as per the street name index printed on the lower right hand corner of the folder. The name "First St", is printed on the map and listed in the index with coordinates for markings 33 and 42. The markings 33 and 42, as read on the index, will give the location on scales 31 and 38 where the word "First" is printed on the map with considerable accuracy and in a very short time.

It will be seen that the map sections may be flipped over conveniently to the proper location which is to be consulted and that by means of the markings 33 and 42 accurate location of street names may be found.

What is claimed is:

1. A map and holder comprising a cover, a map, said map having streets and street names thereon, means for precisely locating said map in said cover, a top scale along the top edge of said cover, a vertical scale, cooperating means on said top and vertical scales so that said vertical scale may be slid along said top edge, said scales having markings along their lengths, whereby by consulting an index of streets for said map which provides a horizontal and a vertical coordinate for the location of the name of a street to be located, the user moves the vertical scale along the top scale until it is at the horizontal coordinate and then reads down the vertical scale to the vertical coordinate to locate where the street name is printed on said map, said cover being made of at least four rectangular sections hinged together along two transverse lines so that said holder may be folded along both said lines into compact form, said map being foldable along the same lines as the holder, said top scale being foldable at a first said line, said vertical scale being pivoted to said first said scale to swing perpendicular to said first said line.

2. A map and holder according to claim 1 in which said map has a relatively stiff insert and in which said holder has a pocket to receive said insert and thereby accurately locate said map relative to said holder.

3. A map and map holder comprising a cover, a map, said map having streets and street names thereon, means for precisely locating said map in said cover, a top scale along the top edge of said cover, a vertical scale, cooperating means on said top and vertical scales so that said vertical scale may be slid along said top edge, said scales having markings along their lengths, whereby by consulting an index of streets for said map which provides a horizontal and a vertical coordinate for the location of the name of a street to be located, the user moves the vertical scale along the top scale until it is at the horizontal coordinate and then reads down the vertical scale to the vertical coordinate to locate where the street name is printed on said map, said cover beng made of plural rectangular sections hinged together so that said holder may be folded into compact form, said map being foldable along the same lines as said holder, said top scale having a terminus at one end and a button immediately outward of said terminus, whereby said vertical scale may be moved outward of said terminus into engagement with said button and then turned diagonally to permit folding of said side sections.

* * * * *